US011691737B2

(12) United States Patent
Miles et al.

(10) Patent No.: US 11,691,737 B2
(45) Date of Patent: Jul. 4, 2023

(54) VEHICLE SEATING

(71) Applicants: UNIVERSAL MOVEMENT LTD, London (GB); SAFRAN SEATS, Plaisir (FR)

(72) Inventors: Luke Miles, London (GB); Hugo Benedict Jamson, London (GB); Cheuk Wah Vincent Fan, London (GB)

(73) Assignees: UNIVERSAL MOVEMENT LTD, London (GB); SAFRAN SEATS, Plaisir (FR)

( * ) Notice: Subject to any disclaimer, the term of this patent is extended or adjusted under 35 U.S.C. 154(b) by 0 days.

(21) Appl. No.: 17/324,975

(22) Filed: May 19, 2021

(65) Prior Publication Data
US 2021/0339869 A1 Nov. 4, 2021

Related U.S. Application Data

(63) Continuation of application No. PCT/GB2019/053286, filed on Nov. 20, 2019.

(30) Foreign Application Priority Data

Nov. 20, 2018 (GB) ...................... 1818909

(51) Int. Cl.
 *B64D 11/06* (2006.01)
(52) U.S. Cl.
 CPC ...... *B64D 11/0606* (2014.12); *B64D 11/0639* (2014.12)

(58) Field of Classification Search
 CPC ................. B64D 11/0606; B64D 11/0639
 See application file for complete search history.

(56) References Cited

U.S. PATENT DOCUMENTS

| 4,496,189 A | 1/1985 | Tanizaki et al. |
| 4,596,420 A | 6/1986 | Vaidya |

(Continued)

FOREIGN PATENT DOCUMENTS

| DE | 202015005732 U1 | 11/2016 |
| EP | 3323670 A1 | 5/2018 |
| WO | 2011089580 A2 | 7/2011 |

OTHER PUBLICATIONS

United Kingdom Combined Search and Examination report dated May 24, 2019 for GB Application No. 1818909.2.

(Continued)

*Primary Examiner* — Philip F Gabler
(74) *Attorney, Agent, or Firm* — EIP US LLP

(57) ABSTRACT

A vehicle seat including: a seat back; a seat pan; and one or more side support elements is disclosed. Each side support element is moveable with respect to the seat back between: a stowed configuration, in which the side support element is stowed flush with, or is stowed within or behind the seat back; and a deployed configuration, in which the side support element extends outwardly from the seat back, generally in the same direction that the seat back faces, so as to offer support to the side of a vehicle user sitting in the vehicle seat. A row of two or more such vehicles seats is also disclosed, in which all of the seats of the row face in the same direction, and adjacent seats within the row are connected to each other.

18 Claims, 9 Drawing Sheets

(56) References Cited

U.S. PATENT DOCUMENTS

| | | |
|---|---|---|
| 5,161,855 A | 11/1992 | Harmon |
| D942,766 S * | 2/2022 | Miles .............................. D6/356 |
| 2008/0111406 A1 | 5/2008 | Friedman |
| 2011/0012386 A1 | 1/2011 | Brncick et al. |
| 2014/0117731 A1 | 5/2014 | Asli |
| 2019/0176673 A1* | 6/2019 | Patel ........................ B60N 2/99 |

OTHER PUBLICATIONS

United Kingdom Examination Report dated Jun. 22, 2020 for GB Application No. 1818909.2.
International Search Report and Written Opinion dated Feb. 21, 2020 for PCT/GB2019/053286.

* cited by examiner

VEHICLE SEATING

CROSS-REFERENCE TO RELATED APPLICATIONS

This application is a continuation of International Application No. PCT/GB2019/053286, filed Nov. 20, 2019 which claims priority to UK Application No. GB 1818909.2, filed Nov. 20, 2018, under 35 U.S.C. § 119(a). Each of the above referenced patent applications is incorporated by reference in its entirety.

BACKGROUND OF THE INVENTION

Field of the Invention

The following disclosure relates to vehicle seating and, in particular, vehicle seats and rows thereof. In specific examples, the seats and rows thereof may be employed in mass transit vehicles, particularly aircraft.

Description of the Related Technology

Various challenges exist in providing suitable vehicle seating. For instance, it can be challenging to provide vehicle seating that meets various sometimes competing priorities, such as being ergonomic (for the occupant and other users of the vehicle), yet durable (particularly in mass transit vehicles, where the seat is used frequently), simple to manufacture, compatible with existing vehicles, and cost effective.

SUMMARY

The following disclosure, in a first aspect, provides a vehicle seat comprising: a seat back; a seat pan; and one or more side support elements, each side support element being moveable with respect to the seat back between: a stowed configuration, in which the side support element is stowed flush with, or is stowed within or behind the seat back; and a deployed configuration, in which the side support element extends outwardly from the seat back, generally in the same direction that the seat back faces, so as to offer support to the side of a vehicle user sitting in the vehicle seat.

The following disclosure also describes a row of two or more vehicles seats according to any of the examples provided herein, in which all of the seats of the row face in the same direction, and adjacent seats within the row are connected to each other.

BRIEF DESCRIPTION OF THE DRAWINGS

Further features will become apparent from the following description, given by way of example only, which is made with reference to the accompanying drawings, in which.

DETAILED DESCRIPTION

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1A:
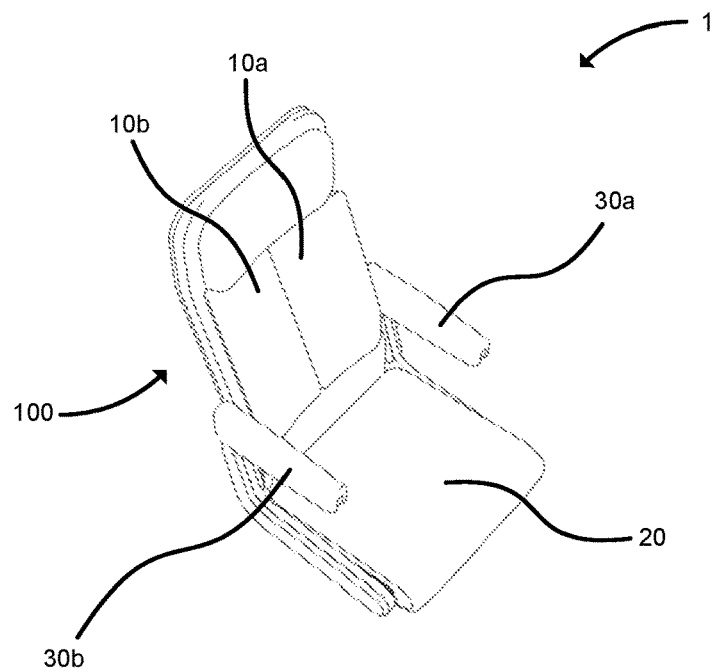
FIGS. 1A-1C are perspective views of a vehicle seat according to a first illustrative embodiment, showing respective stages during the movement of side support elements for the seat from stowed to deployed configurations.

Reference is firstly directed to FIG. 1A, which is a perspective view of a vehicle seat 1 according to a first illustrative embodiment. In the particular example shown, the seat 1 is configured for use in an aircraft. However, it may be configured for use in various other vehicle types. In particular, the seat 1 may be configured for use in any of a variety of mass-transit vehicles, such as aircraft, buses, trains, ferries etc.

Referring to FIG. 1A, the seat 1 includes a seat back 100, and a seat pan 20. Notably, the seat 1 further includes two side support elements 10a, 10b. These side support elements 10a, 10b, when deployed, offer support to the side of the body of a vehicle user, such as a passenger, who is sitting in the vehicle seat. It should be noted that the word "body" is used herein in contradistinction to the word "head"; the side support elements are configured to support, for example, the sides of the user's arms, or their shoulders. In examples where the side supports are particularly tall, for example, of substantially the same height as the seat back 100 (e.g. as described below with reference to the embodiment of FIGS. 2A-2I), the side supports may additionally support the user's head, but this is of course not essential. Conversely, it should be understood that an element that supports only the head of the user is not a "side support element", in the sense used herein.

The inventors consider that supporting a user in a side-leaning or rotated position is particularly ergonomic, providing significant comfort to the user sitting in the seat. This is in contrast to various attempts to increase user comfort by increasing the amount of leg room provided (e.g. by increasing pitch between rows of seats). Supporting a user in a side-leaning position may, for example, allow the user to change their posture, alleviating pressure of various parts of the body.

Figure 1B:
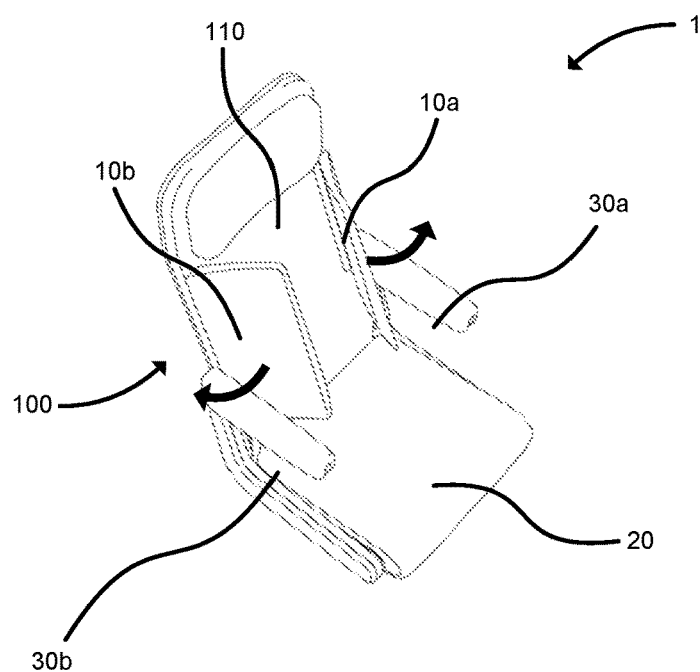
Figure 1C:
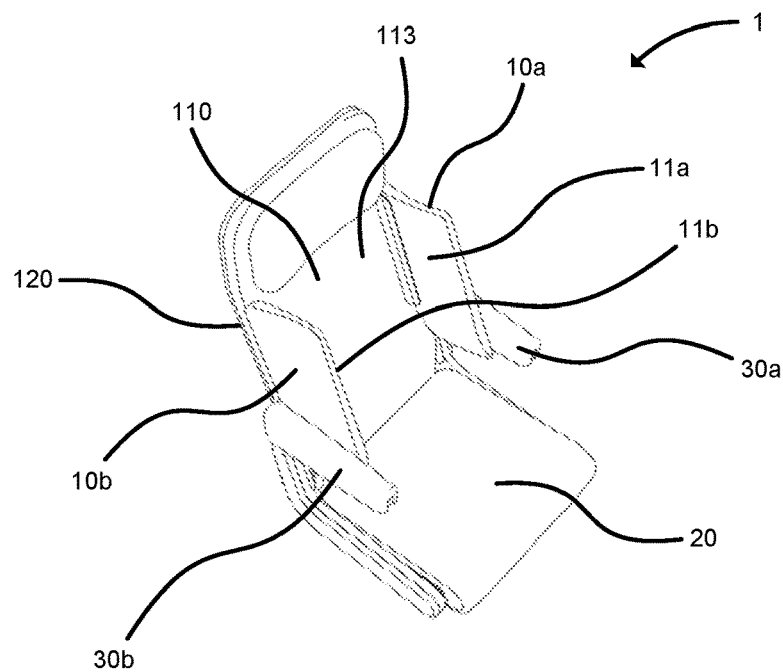

The functionality of these side support elements 10a, 10b may be better understood by considering FIGS. 1A-1C collectively; these drawings show respective stages during the movement of the side support elements 10a, 10b from stowed to deployed configurations.

Specifically, FIG. 1A shows both side support elements 10a, 10b in a stowed configuration, in which each side support element 10a, 10b is stowed flush with the seat back 100. In the stowed configuration, a side support element 10a, 10b does not significantly protrude from the seat back 100. In the particular embodiment shown, each side support element 10a, 10b might, for example, be described as lying flat against the seat back 100 in its stowed configuration.

In at least some cases, a stowed configuration for a side support element 10a, 10b might be described as a low-profile configuration for the side support elements 10a, 10b. Such a low-profile configuration may allow a vehicle user to move past the seat easily.

FIG. 1B shows the side support elements 10a, 10b partway through being moved from stowed to deployed configurations. In this example, as indicated by curved arrows, each side support element 10a, 10b folds out from the seat back 100 as it moves from its stowed configuration to its deployed configuration. As may be appreciated, each side support element is hingeably coupled to the seat back 100.

As used herein, "hingeably coupled" refers to two elements being linked or coupled together such that there is a hinge axis, hinge line, or fold line between them, with the coupling at the line/axis being, for example, significantly more flexible/significantly less rigid than the two elements themselves. As a result, the two elements can rotate, fold, and/or hinge relative to one another, about this axis/line.

FIG. 1C shows the side support elements 10a, 10b fully deployed. In this deployed configuration, each side support element 10a, 10b protrudes a substantial distance from the seat back 100, so as to offer support to the side of the user's body when they are sitting in the vehicle seat 1.

Furthermore, in the deployed configuration, the supporting face 11a, 11b of each side support element 10a, 10b, which offers support to the side of the user sitting in the seat 1, is directed generally orthogonally of the supporting face 113 of the seat back 100, which supports the back of the user sitting in the seat 1. By contrast, as is apparent from FIG. 1A, in the stowed configuration the supporting face 11a, 11b of each side support element 10a, 10b is directed generally parallel to the supporting face 113 of the seat back 100. In the particular embodiment shown, in the stowed configuration, the supporting faces 11a, 11b of the side support elements 10a, 10b oppose the supporting face 113 of the seat back 100. Indeed, in the particular embodiment shown, the supporting faces 11a, 11b of the side support elements 10a, 10b contact and rest upon the supporting face 113 of the seat back 100 when in the stowed configuration.

As shown clearly in FIG. 1C, the seat back 100 includes a cushion 110, which was partly obscured in FIGS. 1A and 1B by side support elements 10a, 10b. As may be seen, this cushion 110 is mounted on a backing structure 120 of the seat back 100. Furthermore, in the illustrated embodiment, the cushion 110 provides the supporting face 113 of the seat back 100.

In the specific example shown in FIGS. 1A-1D, each side support element 10a, 10b is hingeably coupled to the cushion 110 along a respective side edge thereof, for example by a respective living hinge. In such examples, the side support elements 10a, 10b might be described as wings of the cushion 110 or winged side supports. A living hinge may provide a durable join, while also reducing potential discomfort that a user might feel should they accidentally trap a finger between the side support element 10a, 10b and the cushion 110. In some embodiments, the side support elements 10a, 10b may be integrally joined to the cushion. Furthermore, in some embodiments, the side support elements 10a, 10b and the cushion 110 may be made as a single component.

The cushion 110 may, for example, include a fabric cover (for instance made of woven fabric, real or artificial leather or the like) that surrounds and encloses padding or stuffing material, such as a foam filling material or a densified fiber filling material. The backing structure may, for example, be described as providing structural support to the cushion and the user, when sitting in the seat. It may therefore be substantially rigid, for instance being formed from hard plastic materials and/or may include a metal support frame.

It may further be noted that the seat 1 of FIGS. 1A-1C includes two armrests 30a, 30b. As is apparent from FIG. 1C, each side support element 10a, 10b, when in its deployed configuration, abuts and is supported by a corresponding one of the arm rests 30a, 30b. This may assist the side support elements 10a, 10b in providing support to the side of the user's body.

It should however be appreciated that it is by no means essential for the armrests 30a, 30b, to be arranged to provide such support and, moreover, it is by no means essential that the seat 1 includes armrests.

Figure 1D:
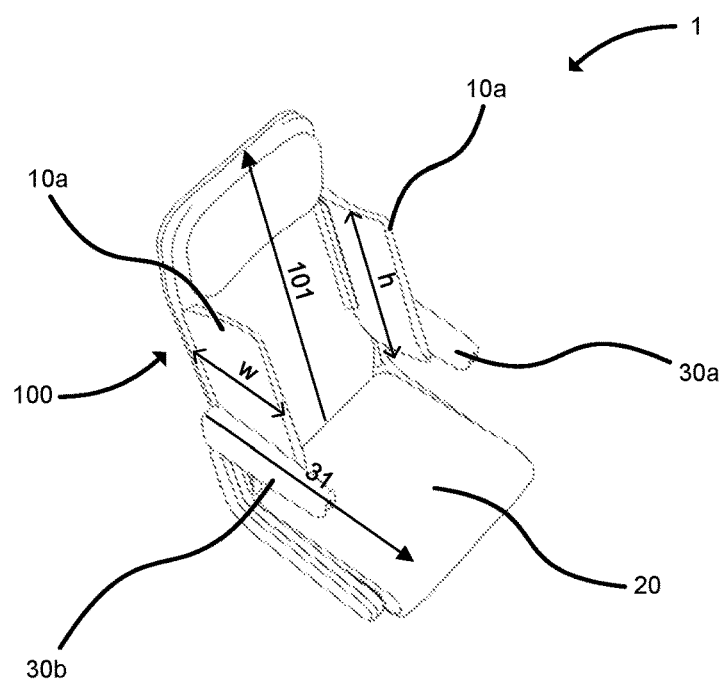
FIG. 1D is a further perspective view of the vehicle seat of FIGS. 1A-1C, illustrating the relative dimensions and arrangement of various elements of the seat.

Attention is now directed to FIG. 1D, which is a further perspective view of the vehicle seat 1 of FIGS. 1A-1C, illustrating the relative dimensions and arrangement of various elements of the seat 1.

As is apparent from FIG. 1D, the seat back 100 is elongate in a length direction, which is indicated by arrow 101. As shown, the seat back 100 extends from the seat pan 20 in this length direction 101. Each side support element 10a, 10b is also elongate in this length direction 101 and, moreover, extends a majority of the extent of the seat back 100 in this length direction 101. A thus-configured side support element 10a, 10b provides a suitable level of side support to a user sitting in the seat 1.

In terms of absolute size, the height of each side support element 10a, 10b (and, in some cases, the height of the supporting face 11a, 11b of each side support element 10a, 10b) may be at least 30 cm, and in some cases may be at least 40 cm, or at least 50 cm. The height of a side support element, or its supporting face, is for example defined such that it is the longest dimension of the side support element or supporting face, as the case may be. In the particular example shown in FIGS. 1A-1D, the thus-defined height of the side support elements 10a, 10b is parallel to the length direction 101. However, it should be noted that, depending on the particular configuration of the seatback 100, the height of the side support element 10a, 10b may be defined in a slightly different direction to the length direction 101 of the seatback 100.

As noted above, in the seat 1 of FIGS. 1A-1D, each side support element is hingeably coupled to the seat back. As may be appreciated from FIG. 1D, the hinge axis for each side support element is generally parallel to the length direction 101 of the seat back 100.

FIG. 1D also indicates, with arrow 31, a length direction for armrest 30b, in which it is elongate. As is apparent from FIG. 1D, the extent of side support element 10b in this length direction 31 is at least a significant fraction of the length of the armrest 30b. For example, the extent of the side support element 10b may be greater than one fifth, in some cases greater than one quarter, or greater than one third, of the length of the corresponding arm rest.

In terms of absolute size, the width of each side support element 10a, 10b may be at least 10 cm, and in some cases may be at least 20 cm. The width of a side support element is for example defined such that it is perpendicular to the longest dimension of the side support element, the height (and may, for example, be further defined such that it is perpendicular to the smallest dimension, the thickness). It should be noted that, depending on the particular configuration of the seat 1 and armrests 30a, 30b, the width of the side support element 10a, 10b may be defined in a slightly different direction to the length direction 31 of the armrests 30a, 30b. Moreover, it should be appreciated that the values above for the width of the side support elements 10a, 10b are suitable in embodiments where the seat 1 does not include armrests 30a, 30b.

It will be appreciated that the other side support element 10a shown in FIG. 1D is similarly configured relative to the other armrest 30a.

While the embodiment of FIGS. 1A-1D includes two side support elements, it should be understood that in other embodiments only one side support element 10a, 10b might be provided. Indeed, seats could be provided with any suitable number of side support elements, though in many cases one or two side supports will be appropriate.

Attention is now directed to FIGS. 2A-2I, which show perspective views of a vehicle seat 1 according to a further illustrative embodiment.

Figure 2A:
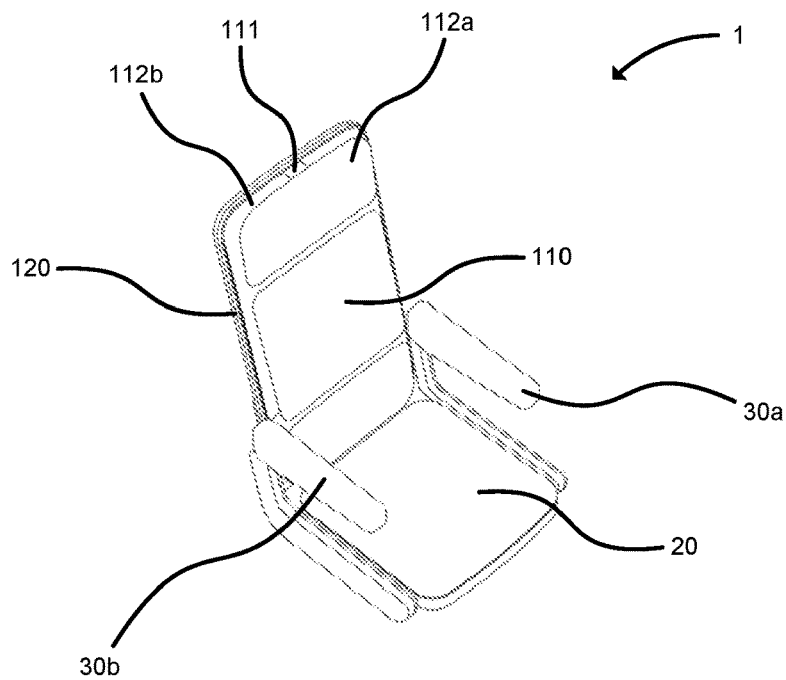
FIGS. 2A-2H are perspective views of a vehicle seat according to a further illustrative embodiment, showing respective stages during the movement of side support elements from stowed to deployed configurations.
Figure 2B:
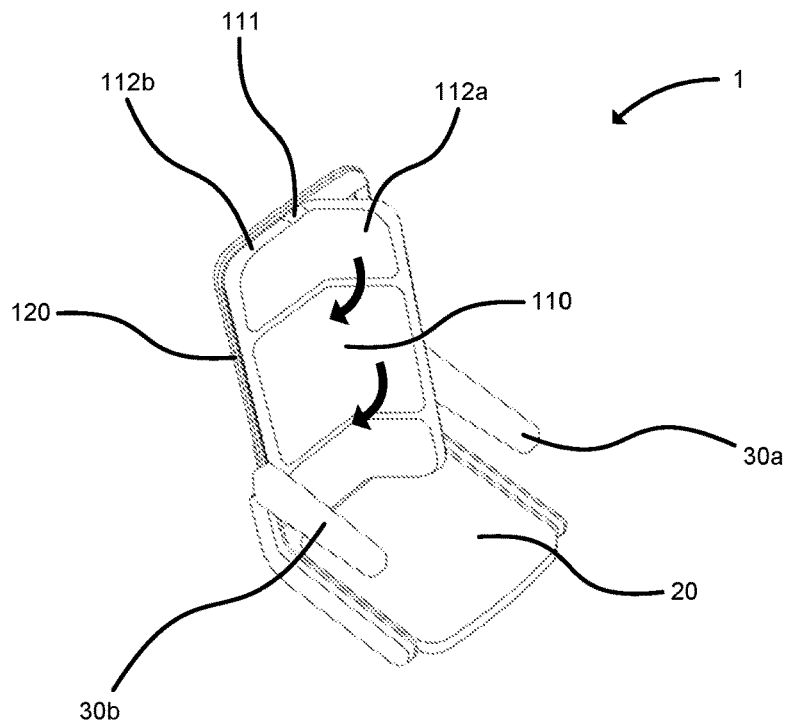
Figure 2C:
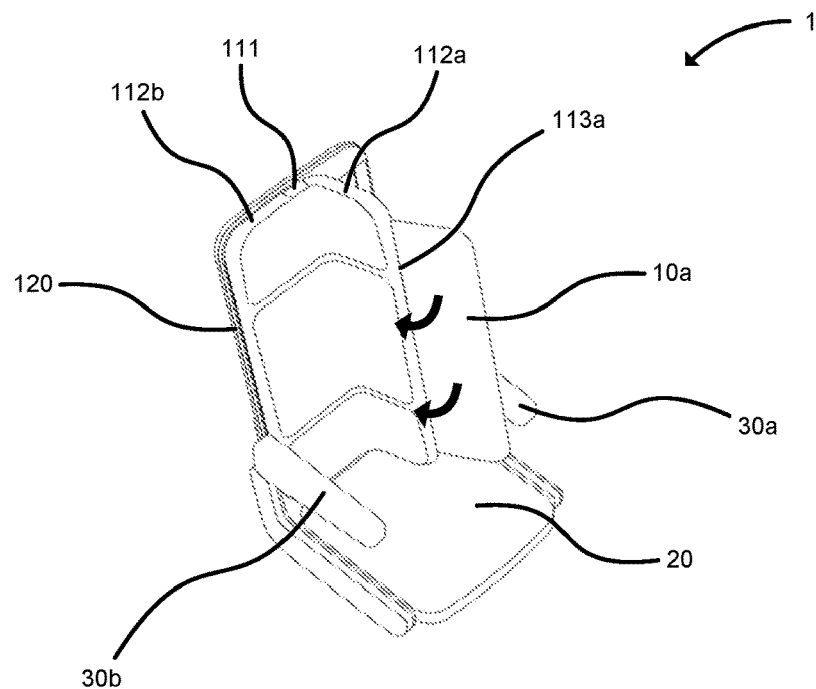
Figure 2D:
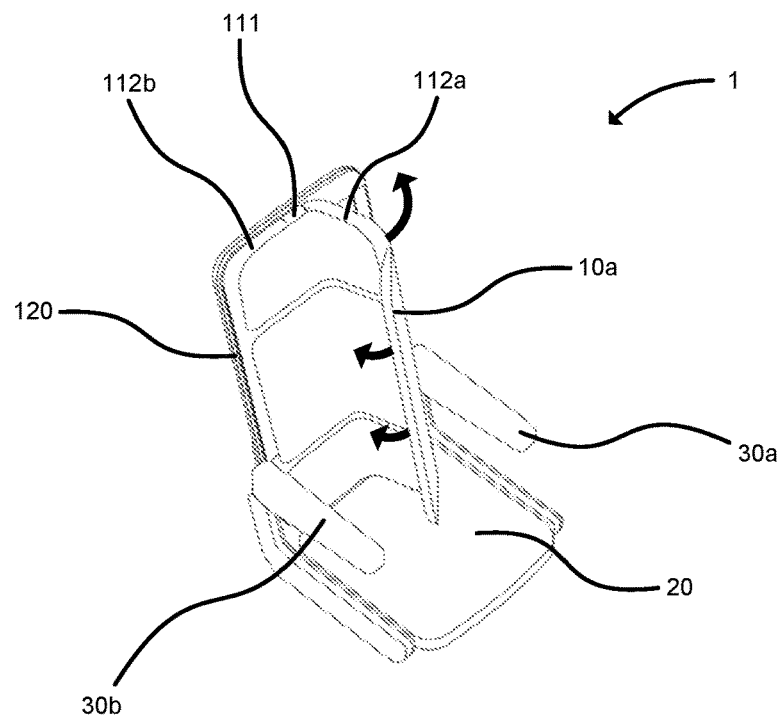
Figure 2E:
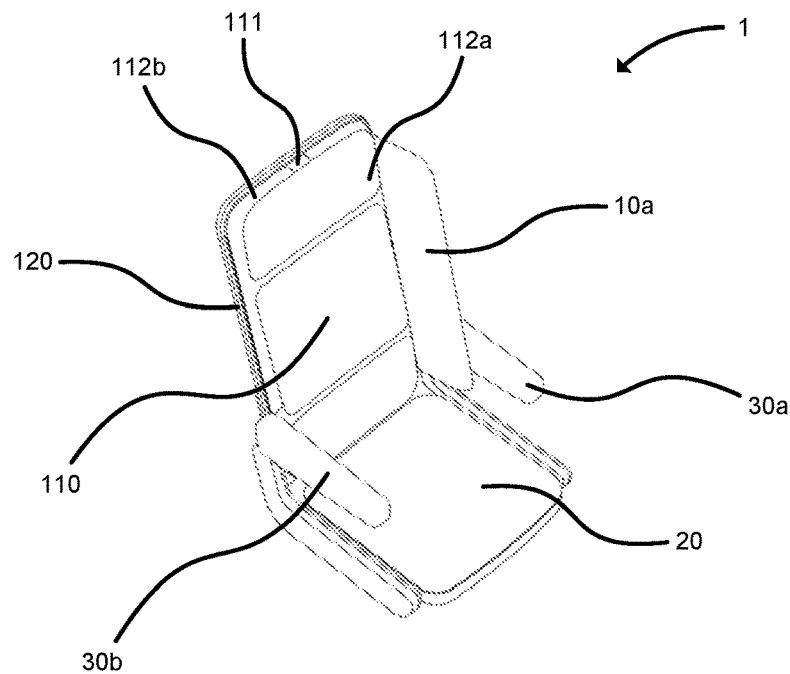
Figure 2F:
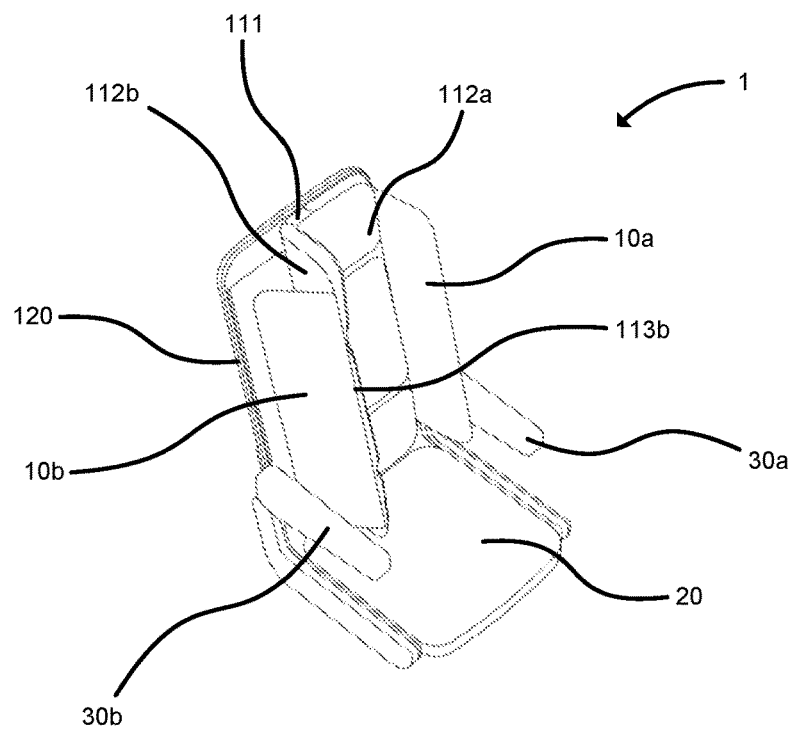
Figure 2G:
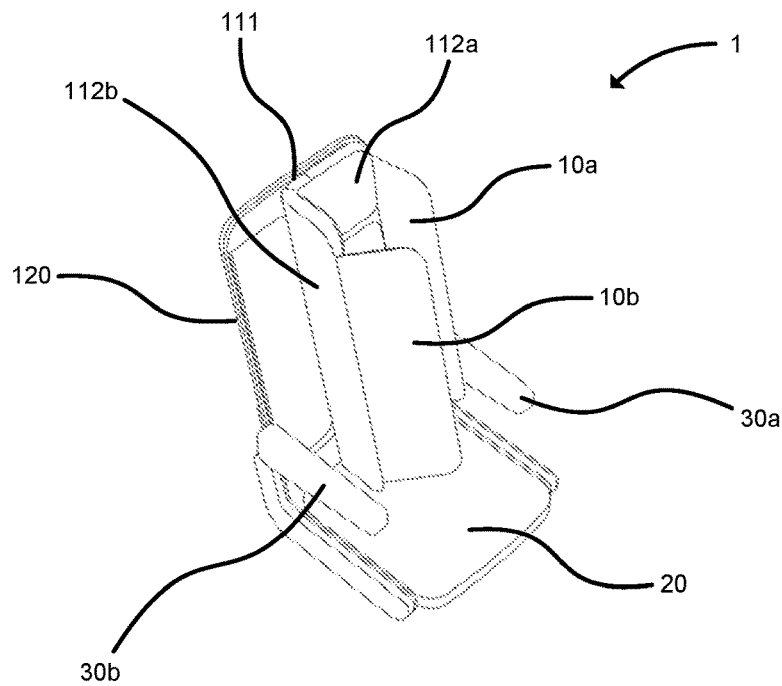
Figure 2H:
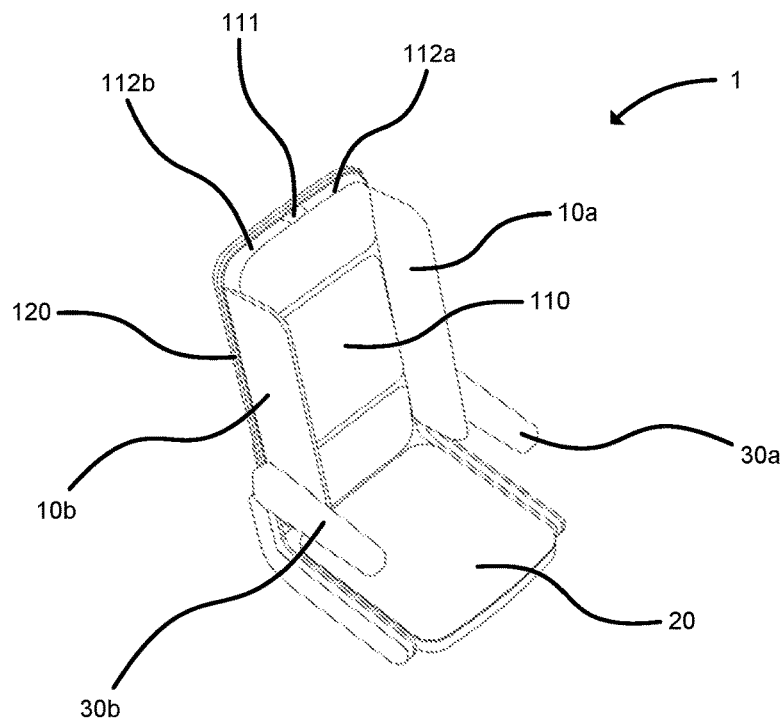

The series of views provided by FIGS. 2A-2H show respective stages during the movement of the side support elements 10a, 10b of the seat 1 from stowed to deployed configurations of the side support elements 10a, 10b. More particularly, FIGS. 2A-2E show the deployment of one side support element 10a and FIGS. 2F-2H show the deployment of the other side support element 10b.

Similarly to the seat 1 of the embodiment of FIGS. 1A-1D, each side support element 10a, 10b of the seat of FIGS. 2A-2I folds out from the seat back 100 when moving from its stowed configuration to its deployed configuration. The folding out of side support element 10a from the seat back 100 is indicated by curved arrows in FIGS. 2C and 2D.

However, whereas in the embodiment of FIGS. 1A-1D each support element 10a, 10b, was stowed flush against the seat back 100 (and, more particularly, flush against the cushion 110 thereof), in the embodiment of FIGS. 2A-2I, each support element 10a, 10b is stowed within the seat back 100, between the cushion 110 and the backing structure 120. This is perhaps best shown in FIG. 2F, where side support element 10b is in the process of moving from its stowed configuration to its deployed configuration.

In at least some cases, such a stowed configuration might be described as a low-profile configuration for the side support elements 10a, 10b. Such a low-profile configuration may allow a vehicle user to move past the seat easily. For instance, a passenger moving past seat 1(*i*) to sit in seat 1(*iii*) will be substantially unhindered by the side support elements 10a, 10b.

In some embodiments, such as that shown in FIGS. 2A-2I, the cushion 110 may completely cover the side support elements 10a, 10b when they are in their respective stowed configurations. In this way, the side support elements 10a, 10b may be neatly stowed away when not needed by the user. Additionally, or alternatively, the cushion may completely cover the backing structure 120, as shown in FIGS. 2A-2I.

As is apparent from considering the movement of the side support elements 10a, 10b depicted in FIGS. 2A-2H, each of the side support elements 10a, 10b is hingeably coupled to the seat back 100. More particularly, each side support element 10a, 10b is hingeably coupled to the cushion 110 of the seat back 100.

In the specific example shown, each side support element 10a, 10b is hingeably coupled to the cushion 110 along a respective side edge thereof, for example by a respective living hinge. In such examples, the side support elements 10a, 10b might be described as wings of the cushion 110 or winged side supports. As noted above, a living hinge may provide a durable join, while also reducing potential discomfort that a user might feel should they accidentally trap a finger between the side support element 10a, 10b and the cushion 110. In some embodiments, the side support elements 10a, 10b may be integrally joined to the cushion. Furthermore, in some embodiments, the side support elements 10a, 10b and the cushion 110 may be made as a single component that is folded and attached (e.g. at a central portion 111 of the cushion 110) to the seat backing 120.

In other embodiments, such coupling of the side support elements 10a, 10b to the cushion 110 might, for example, be achieved by sewing, bonding (e.g. using an adhesive), or otherwise attaching each side support element onto a respective side edge of the cushion 110.

As is also apparent from FIGS. 2A-2I, in the particular example shown the cushion 110 includes, for each of the side support elements 10, 10b, a respective side portion 112a, 112b. Each of these cushion side portions 112a, 112b is hingeably joined to a central portion of the cushion 111 (e.g. by a respective living hinge), which is in turn attached to the backing structure 120 of the seat back. For instance, the side support elements 10a, 10b and the cushion 110 may be made as a single component that is folded and attached, at the central portion 111, to the seat backing 120. As may be seen, each cushion side portion 112a, 112b provides a respective one of the side edges 113a, 113b of the cushion 110 along which the corresponding side support element 10a, 10b is hingeably coupled.

The hingeable joining of the cushion side portions 112a, 112b to the cushion central portion 111 allows the cushion side portions 112a, 112b to be folded out from the backing structure 120, which in turn assists the user in accessing and folding out the side support elements 10a, 10b. As an example, FIG. 1B shows, using curved arrows, cushion side portion 112a being folded out from the backing structure 120, which then assists the user in accessing and folding out side support element 10a, as shown in FIGS. 1C and 1D using curved arrows.

It should be appreciated that it is not essential that the side portions 112a, 112b are hingeably joined to the central portion 111. Rather, this is considered to be a suitable way to provide cushion side portions 112a, 112b that are free of the backing structure 120, such that each cushion side portion 112a, 112b can be moved away from the backing structure 120 to assist the user in accessing the corresponding side support element 10a, 10b.

Thus, in alternative embodiments, the cushion 110 could be made relatively flexible, so that the unattached side portions can bend outwardly, away from the backing structure 120 (as opposed to folding or hinging along a hinge line, as in the example of FIGS. 2A-2I), while the central portion 111 remains attached thereto. It will be appreciated that such an arrangement would similarly assist the user in accessing and folding out the side support elements 10a, 10b.

Returning briefly to FIG. 2A, it will be noted that each cushion side portion 112a, 112b completely covers a corresponding one of the side support elements 10a, 10b when in its stowed configuration. In this way, the side support elements 10a, 10b may be neatly stowed away when not needed by the user.

Figure 2I:
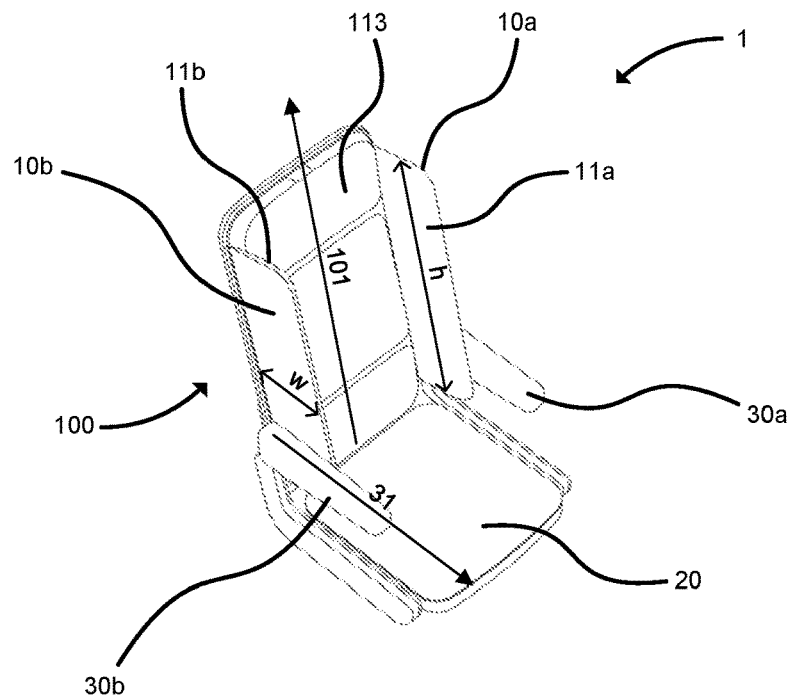
FIG. 2I is a further perspective view of the vehicle seat of FIGS. 2A-2H, illustrating the relative dimensions and arrangement of various elements of the seat.

Attention is now to FIG. 2I, which is a further perspective view of the vehicle seat 1 of FIGS. 2A-2H, illustrating the relative dimensions and arrangement of various elements of the seat 1.

As may be seen from FIG. 2I, the seat back 100 is elongate in a length direction, which is indicated by arrow 101. As shown, the seat back 100 extends from the seat pan 20 in this length direction 101. Each side support element 10a, 10b is also elongate in this length direction 101 and, moreover, extends substantially the full extent of the seat back 100 in this length direction 101. Furthermore, the cushion central portion 111 and the cushion side portions 112a, 112b are elongate in this length direction 101.

As noted above, in the seat 1 of FIGS. 2A-2I, each side support element 10a, 10b is hingeably coupled to the seat back 100, specifically to respective side edges of the cushion 110 thereof. As may be appreciated from FIG. 2I, the hinge axis for each side support element is generally parallel to the length direction 101 of the seat back 100. Furthermore, the side edges of the cushion 110, to which the side support elements 10a, 10b are attached, similarly extend generally parallel to this length direction 101.

As also noted above, in the seat 1 of FIGS. 2A-2I, each of the cushion side portions 112a, 112b is hingeably joined to the central portion of the cushion 111. As may also be appreciated from FIG. 2I, the respective hinge axes for these joints may likewise be generally parallel to the length direction 101 of the seat back 100.

It may further be noted that the seat 1 of FIGS. 2A-2J includes two armrests 30a, 30b. As is apparent from FIGS. 2H and 2I, each side support element 10a, 10b, when in its deployed configuration, abuts and is supported by a corresponding one of the arm rests 30a, 30b. This may assist the side support elements 10a, 10b in providing support to the side of the user's body.

FIG. 2I also indicates, with arrow 31, a length direction for armrest 30b, in which it is elongate. As is apparent from FIG. 2I, the extent of the side support element 10b in this length direction 31 is at least a significant fraction of the length of the armrest 30b. For example, the extent of the side support element 10b may be greater than one quarter, or greater than one third, of the length of the corresponding arm rest.

As will be appreciated, FIG. 2I shows both support elements 10a, 10b in their deployed configurations. As is apparent, in the deployed configuration, the supporting face 11a, 11b of each side support element 10a, 10b is directed generally orthogonally of the supporting face 113 of the seat back 100. By contrast, in the stowed configuration, the supporting face 11a, 11b of each side support element 10a, 10b is directed generally parallel to the supporting face 113 of the seat back 100, as is apparent from FIG. 2A. More particularly, in the stowed configuration, the supporting faces 11a, 11b of the side support elements 10a, 10b face in a direction that is opposite to that in which the supporting face 113 of the seat back 100 faces.

In this respect, the side support elements 10a, 10b of the embodiment of FIGS. 2A-2I are similar to those of the embodiment of FIGS. 1A-1D. However, it will be noted that when the side support elements 10a, 10b of the embodiment of FIGS. 1A-1D are in their stowed configurations, their respective supporting faces 11a, 11b contact and rest upon the supporting face 113 of the seat back 100. The same is not true for the side support elements 10a, 10b of the embodiment of FIGS. 2A-2I, since they are stowed behind the cushion 110, within the seat back 100.

Figure 2J:
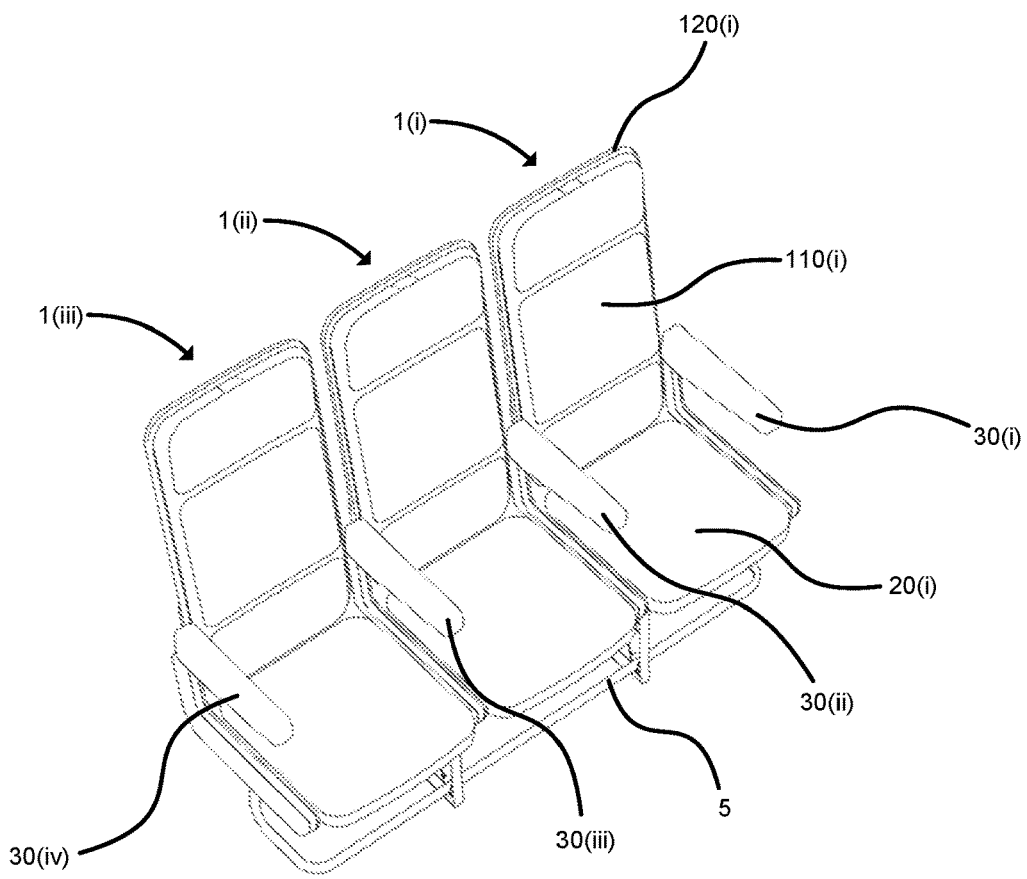
FIG. 2J is a perspective view of a row of the seats illustrated in FIGS. 2A-I.

Attention is now directed to FIG. 2J, which is a perspective view of a row of the seats 1 illustrated in FIGS. 2A-I. In the particular example shown, the row includes three substantially identical seats 1(i)-(iii), which all face in the same direction. It should however be understood that the row could include any appropriate number of seats.

In the particular illustrative embodiment shown in FIG. 2J, the row of seats includes a seat base 5, to which the seats 1(i)-(iii) are attached. The row of seats 1(i)-(iii) may then be installed as a single module within a vehicle. The seat base 5 may, for example, include several connectors, which engage with corresponding features on the floor of a vehicle, during installation of the row.

As shown in FIG. 2J, neighbouring seats 1 within the row have a single armrest 30 disposed (and shared) between them. Such an arrangement with only one armrest 30 between seats 1 may be particularly suited to high-density applications, such as economy-class seating. In less high-density applications, such as business-class seating, each seat 1 might be provided with a respective pair of armrests, with neighbouring seats consequently being separated by two armrests 30.

Because the side support elements 10 described herein can be easily moved to their low profile stowed configuration, each seat 1(i)-(iii) in the row can be provided with a respective pair of side support elements 10, as shown in FIG. 2J, without materially affecting the accessibility of the row for passengers. When the side support elements 10 for the row are deployed, neighbouring seats will then be separated by two side support elements (one for each of the neighbouring seats). This may offer passengers a high level of privacy, even in a relatively confined space.

Figure 3A:
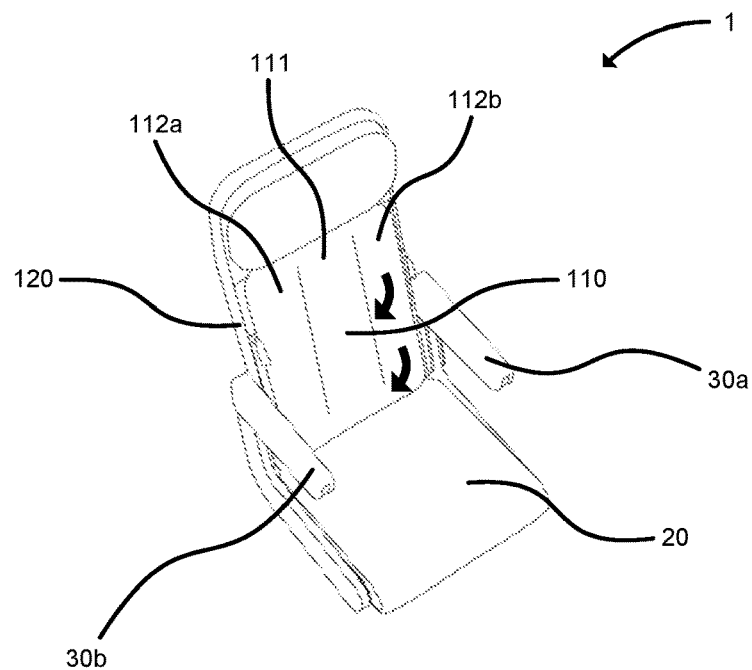
FIGS. 3A-3C are perspective views of a vehicle seat according to a still further illustrative embodiment, showing respective stages during the movement of a side support element from stowed to deployed configurations.
Figure 3B:
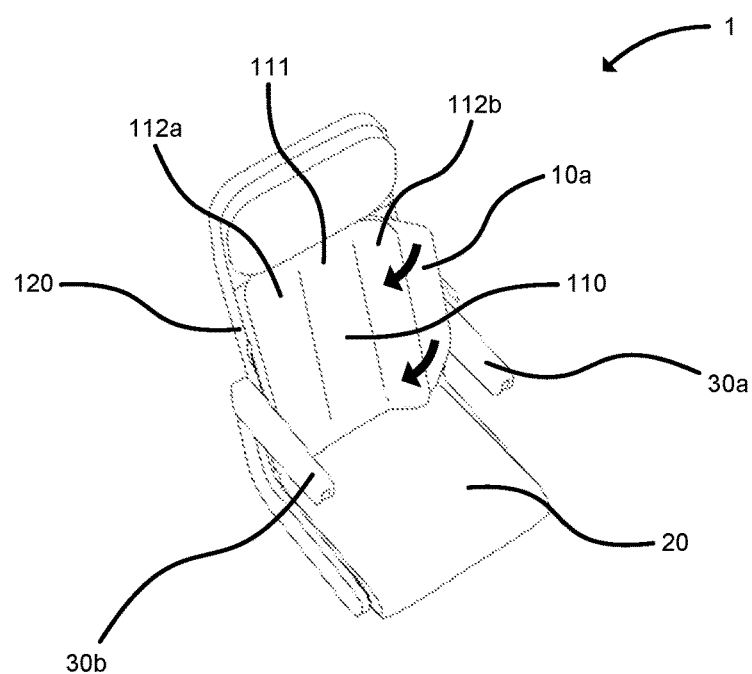
Figure 3C:
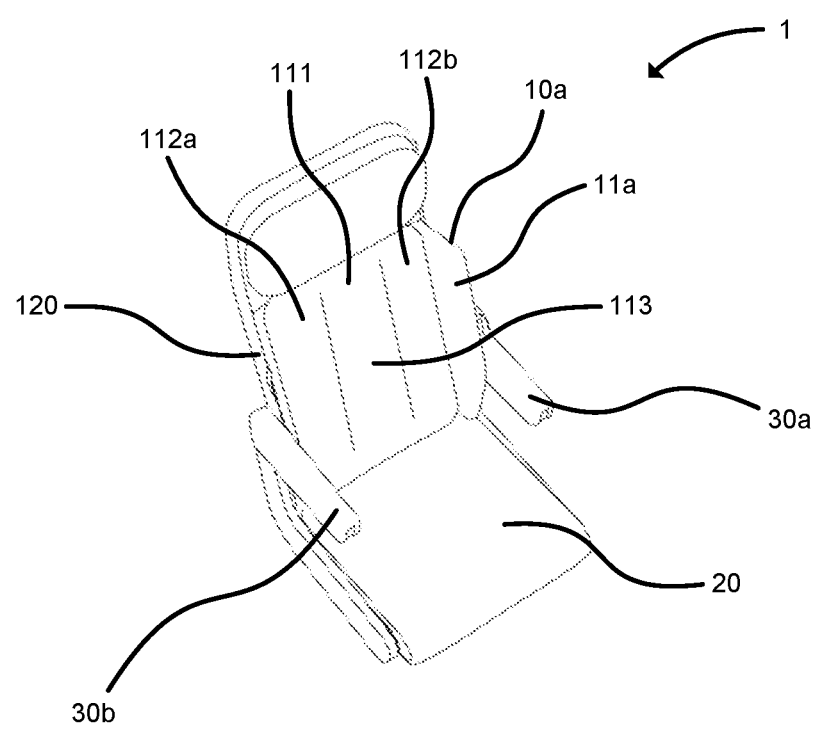

Attention is now directed to FIGS. 3A-3C, which are perspective views of a vehicle seat 1 according to a still further illustrative embodiment, showing respective stages during the movement of a side support element 10a from a stowed to a deployed configuration. While the deployment of only one side support element 10a is shown, it will be appreciated that a further side support element 10b (for the opposite side of the seat 1) may be deployed in essentially the same manner.

Similarly to the seats shown in FIGS. 1A-1D and FIGS. 2A-2I, each side support element 10a, 10b of the seat 1 of FIGS. 3A-3C folds out from the seat back 100 when moving from its stowed configuration to its deployed configuration, as indicated by curved arrows in FIG. 3B.

Furthermore, the seat 1 of the embodiment of FIGS. 3A-3C is similar to that in the embodiment of FIGS. 2A-2I in that each support element 10a, 10b is stowed within the seat back 100, between the cushion 110 and the backing structure 120.

However, the seat 1 shown in FIGS. 3A-3C differs from those of the previous embodiments in that the side support elements 10a, 10b are coupled to the backing structure 120, rather than the cushion 110. In the particular example shown, each side support element 10a, 10b is hingeably and slideably coupled to the backing structure 120. Specifically, the axis about which each side support element 10a, 10b rotates is able to move laterally with respect to the backing structure 120 (e.g. remaining in the same plane as the backing structure 120). Such a combination of sliding and hinging coupling may allow the side support element 10a to fold out in a particularly space-efficient manner.

A further similarity to seat 1 of FIGS. 2A-2I is that the cushion 110 of the seat 1 of FIGS. 3A-3C includes a respective side portion 112a, 112b for each side support element 10a, 10b. As before, each such cushion side portion 112a, 112b is hingeably joined to a cushion central portion 111, which is then attached to the backing structure 120 of the seat back 100. As noted above, this allows the cushion side portions 112a, 112b to be folded out from the backing structure 120, as indicated by curved arrows in FIG. 3A, thereby assisting the user in accessing and folding out the side support elements 10a, 10b.

A further similarity to seat 1 of FIGS. 2A-2I is that the cushion 110 of the seat 1 of FIGS. 3A-3C completely covers the side support elements 10a, 10b when they are in their respective stowed configurations. In this way, the side support elements 10a, 10b may be neatly stowed away when not needed by the user. Furthermore, as with the seat 1 of FIGS. 2A-2I, the cushion 110 of the seat 1 of FIGS. 3A-3C completely covers the backing structure 120.

As will be appreciated from FIG. 3C, which shows support element 10a in its deployed configuration, the supporting face 11a, 11b of each side support element 10a, 10b, in its deployed configuration, is directed generally orthogonally of the supporting face 113 of the seat back 100. By contrast, in the stowed configuration, the supporting face 11a, 11b of each side support element 10a, 10b is directed generally parallel to the supporting face 113 of the seat back 100, as is apparent from FIG. 3A. More particularly, in the stowed configuration, the supporting faces 11a, 11b of the side support elements 10a, 10b face in generally the same direction as that in which the supporting face 113 of the seat back 100 faces.

It may further be noted that the seat 1 of FIGS. 3A-3C includes two armrests 30a, 30b. As is apparent from FIG. 3C, each side support element 10a, 10b, when in its deployed configuration, abuts and is supported by a corresponding one of the arm rests 30a, 30b. This may assist the side support elements 10a, 10b in providing support to the side of the user's body.

While in the embodiments of FIGS. 2A-2I and 3A-3C the seat includes one cushion, with each side support element being stowed between this cushion and the backing structure, it should be understood that, in other embodiments, the seat might include two (or perhaps more) cushions, with a respective side support element being stowed between each cushion and the backing structure. Each such cushion might, as described above, include a cushion central portion, which is attached to the seat's backing structure, as well as a respective side portion for each side support element. However, in some embodiments, at least some of the cushions might be configured differently. For instance, the seat might include two (or more) cushions, each of which is hingeably coupled to both the backing structure and to a respective side support element (e.g. along opposite edges of the cushion in question).

Nonetheless, it is considered that embodiments where a single cushion (which may, for example, cover substantially the entire backing structure) is used may be simpler to manufacture and/or may provide the user with greater comfort.

The seats described above with reference to FIGS. 1-3 may be configured for use in various vehicle types. In particular, the seats may be used in mass-transit vehicles, such as aircraft, buses, trains, ferries etc.

Additionally, while the seats according to the embodiments shown in FIGS. 1-3 include armrests 30, it should be understood that this is not essential and the armrests could be omitted in alternative embodiments.

Furthermore, while the embodiments described above include two side support elements, it should be understood that in other embodiments only one side support element might be provided. Indeed, seats could be provided with any suitable number of side support elements, though in many cases one or two side supports will be appropriate.

More generally, the above embodiments are to be understood as illustrative examples. Further examples and embodiments are envisaged.

Furthermore, it is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. A vehicle seat comprising:
   a seat back, which comprises a backing structure and a cushion, the cushion being mounted on said backing structure;
   a seat pan; and
   one or more side support elements, each side support element being hingeably coupled to the seat back and moveable manually with respect to the seat back between:
      a stowed configuration, in which the side support element is stowed within the seat back, between said cushion and said backing structure; and
      a deployed configuration, in which the side support element extends outwardly from the seat back, generally in the same direction that the seat back faces, so as to offer support to the side of a vehicle user sitting in the vehicle seat.

2. The vehicle seat according to claim 1, wherein the seat back is elongate in a length direction, each side support element being hingeably coupled to the seat back so as to be articulated about a respective hinge axis that is generally parallel to said length direction.

3. The vehicle seat according to claim 1, wherein, to move from said stowed configuration to said deployed configuration, each side support element folds out from the seat back.

4. The vehicle seat according to claim 1, wherein each side support element has a supporting face, which offers support to the side of a user sitting in the vehicle seat, when the side support element in question is in the deployed configuration,
   wherein the seat back has a supporting face, which offers support to the back of a user sitting in the vehicle seat;
   wherein the supporting face of a given side support element is directed generally orthogonally of the supporting face of the seat back, when the given side support element is in the deployed configuration, and is directed generally parallel to the supporting face of the seat back, when the given side support element is in the stowed configuration.

5. The vehicle seat according to claim 1, wherein the cushion comprises:
   a cushion central portion, which is attached to said backing structure; and
   a respective cushion side portion for each side support element, each cushion side portion being free of the backing structure, so that the cushion side portion in question can be moved away from the backing structure, thereby assisting the user in accessing the corresponding side support element.

6. The vehicle seat according to claim 5, wherein each cushion side portion is hingeably joined to said cushion central portion.

7. The vehicle seat according to claim 1, wherein each side support element is hingeably coupled to the cushion along a respective side edge thereof.

8. The vehicle seat according to claim 7, wherein each side support element is joined to the cushion by a respective living hinge.

9. The vehicle seat according to claim 1, wherein each side support element is integrally joined to the cushion.

10. The vehicle seat according to claim 1, wherein each side support element is hingeably coupled to said backing structure.

11. The vehicle seat according to claim 1, wherein the seat back is elongate in a length direction and extends from the seat pan in said length direction; and wherein each side support element is elongate and extends at least the majority of the extent of the seat back in said length direction.

12. The vehicle seat according to claim 1, further comprising at least one arm rest;

wherein each side support element, when in the deployed configuration, abuts and is supported by a corresponding one of the arm rests.

13. The vehicle seat according to claim 1, comprising at least one arm rest, each of which is elongate, having a length in a length direction, wherein the extent of each side support element in said length direction, when in the deployed configuration, is greater than one quarter, and preferably greater than one third, of the length of the corresponding arm rest.

14. The vehicle seat according to claim 1, configured as an aircraft passenger seat.

15. A row of two or more of the vehicle seats according to claim 1, all of said seats facing in the same direction, adjacent seats within the row being connected to each other.

16. The row of seats according to claim 15, further comprising a seat base, to which said seats are attached, wherein said seat base comprises one or more connectors, which are configured to engage with corresponding features on a floor of a vehicle, so as to enable the row to be installed within the vehicle.

17. The row of vehicle seats according to claim 15, wherein neighboring seats are separated by at least one of the side support elements when in the deployed configuration.

18. The row of seats according to claim 15, further comprising one or more armrests, neighboring seats within the row having one of said armrests disposed between them.

* * * * *